United States Patent
Cullen et al.

(10) Patent No.: US 10,046,847 B2
(45) Date of Patent: Aug. 14, 2018

(54) AIRCRAFT INTERIOR FLOORING SYSTEMS

(71) Applicant: Greenpoint Technologies, Inc., Kirkland, WA (US)

(72) Inventors: Camillus A. Cullen, Kenmore, WA (US); Marc Levy, Kirkland, WA (US)

(73) Assignee: Greenpoint Technologies, Inc., Kirkland, WA (US)

( * ) Notice: Subject to any disclaimer, the term of this patent is extended or adjusted under 35 U.S.C. 154(b) by 0 days.

(21) Appl. No.: 15/868,862

(22) Filed: Jan. 11, 2018

(65) Prior Publication Data

US 2018/0134368 A1 May 17, 2018

Related U.S. Application Data

(62) Division of application No. 14/747,987, filed on Jun. 23, 2015, now Pat. No. 9,896,185.

(60) Provisional application No. 62/016,002, filed on Jun. 23, 2014.

(51) Int. Cl.
   *B64C 1/22*   (2006.01)
   *B64C 1/20*   (2006.01)
   *B64D 9/00*   (2006.01)

(52) U.S. Cl.
   CPC .............. *B64C 1/20* (2013.01); *B64D 9/003* (2013.01)

(58) Field of Classification Search
   CPC .. B64C 1/20; B64D 9/003; B64D 9/00; B64D 11/06; B64D 11/00; B64D 11/0696; B60P 1/00; Y02T 50/46; Y02T 50/44
   See application file for complete search history.

(56) References Cited

U.S. PATENT DOCUMENTS

| | | | | |
|---|---|---|---|---|
| 2,494,690 A | * | 1/1950 | Cerny | B64D 9/00 105/325 |
| 3,059,593 A | * | 10/1962 | Mack | B60P 7/14 220/541 |
| 4,062,298 A | * | 12/1977 | Weik | B60P 7/0815 248/503 |
| 4,479,621 A | * | 10/1984 | Bergholz | B64C 1/18 244/117 R |
| 5,083,727 A | * | 1/1992 | Pompei | B64D 11/0007 105/345 |

(Continued)

*Primary Examiner* — Medhat Badawi
(74) *Attorney, Agent, or Firm* — Seed Intellectual Property Law Group LLP

(57) ABSTRACT

An aircraft flooring system for an aircraft fuselage adapted to secure a payload component may include first and second seat tracks extending longitudinally with respect to the aircraft fuselage, the first and second seat tracks being spaced from one another; and an intercostal assembly extending between the first and second seat tracks. The intercostal assembly can include a first intercostal having a center member having a first end and a second end and a top flange including a mounting region between the first and second ends; and at least first and second tab members. The first tab member can be coupled to the top flange toward the first end of the center member and the second tab member can be coupled to the top flange toward the second end of the center member. The first and second tab members can extend beyond the first and second ends of the center member, respectively, and be configured to be coupled to the first and second seat tracks.

16 Claims, 12 Drawing Sheets

(56) References Cited

U.S. PATENT DOCUMENTS

| | | | | |
|---|---|---|---|---|
| 5,090,639 A * | 2/1992 | Miller | B64D 9/00 | 244/118.1 |
| 5,178,346 A * | 1/1993 | Beroth | B64D 9/003 | 244/118.1 |
| 5,234,297 A * | 8/1993 | Wieck | B64D 9/003 | 244/118.1 |
| 5,322,244 A * | 6/1994 | Dallmann | B64D 11/04 | 244/118.1 |
| 5,383,630 A * | 1/1995 | Flatten | B64D 11/06 | 244/118.6 |
| 5,393,013 A * | 2/1995 | Schneider | B64D 11/0023 | 160/351 |
| 5,752,673 A * | 5/1998 | Schliwa | B64C 1/061 | 244/118.1 |
| 5,823,724 A * | 10/1998 | Lee | B60P 7/0815 | 410/104 |
| 5,871,318 A * | 2/1999 | Dixon | B60N 2/01558 | 244/118.1 |
| 6,068,214 A * | 5/2000 | Kook | B64D 9/00 | 244/118.1 |
| 6,260,813 B1 * | 7/2001 | Whitcomb | B64D 11/0696 | 244/118.6 |
| 6,302,358 B1 * | 10/2001 | Emsters | B64C 1/20 | 244/137.1 |
| 6,514,021 B2 * | 2/2003 | Delay | B60P 7/0815 | 410/104 |
| 6,554,225 B1 * | 4/2003 | Anast | B64C 1/18 | 105/422 |
| 6,572,304 B1 * | 6/2003 | Hessling | B60R 11/00 | 244/118.5 |
| 6,601,798 B2 * | 8/2003 | Cawley | B60N 2/0224 | 244/118.6 |
| 6,824,104 B2 * | 11/2004 | Smallhorn | B64D 11/0015 | 244/1 R |
| 6,863,344 B2 * | 3/2005 | Smallhorn | B64D 11/0015 | 108/44 |
| 6,875,916 B2 * | 4/2005 | Winkelbach | B64C 1/18 | 174/482 |
| 7,086,874 B2 * | 8/2006 | Mitchell | B64D 11/06 | 244/118.6 |
| 7,188,805 B2 * | 3/2007 | Henley | B64D 11/06 | 244/118.5 |
| 7,207,523 B2 * | 4/2007 | Callahan | B60R 16/0207 | 174/10 |
| 7,338,013 B2 * | 3/2008 | Vetillard | B64C 1/18 | 244/117 R |
| 7,370,831 B2 * | 5/2008 | Laib | B64C 1/18 | 174/70 B |
| 7,389,960 B2 * | 6/2008 | Mitchell | B60N 2/0224 | 244/118.5 |
| 7,410,127 B1 * | 8/2008 | Ahad | B64D 11/0696 | 244/118.5 |
| 7,713,009 B2 * | 5/2010 | Hudson | B64D 11/0696 | 410/104 |
| 7,861,462 B2 * | 1/2011 | Smith | E05F 11/385 | 49/348 |
| 7,900,990 B2 * | 3/2011 | Townson | B60P 7/0815 | 296/100.16 |
| 8,061,035 B2 * | 11/2011 | Stulc | B64C 1/069 | 244/119 |
| 8,496,206 B2 * | 7/2013 | Johnson | B61D 17/041 | 156/245 |
| 8,979,025 B1 | 3/2015 | Curry et al. | | |
| 9,079,665 B2 * | 7/2015 | Larson | B60P 7/08 | |
| 9,284,036 B2 * | 3/2016 | Kook | B64C 1/18 | |
| 9,738,371 B2 * | 8/2017 | Stulc | B64C 1/069 | |
| 9,738,402 B2 * | 8/2017 | Brown | B64F 5/60 | |
| 2005/0211840 A1 * | 9/2005 | Grether | B64C 1/20 | 244/119 |
| 2005/0224648 A1 * | 10/2005 | Grether | B64C 1/20 | 244/118.5 |
| 2005/0224650 A1 * | 10/2005 | Reed | B64C 1/18 | 244/119 |
| 2008/0149804 A1 * | 6/2008 | Grether | B64C 1/20 | 248/503.1 |
| 2010/0116933 A1 * | 5/2010 | Erickson | B64C 1/20 | 244/118.5 |
| 2011/0068225 A1 * | 3/2011 | Curry | B64C 1/20 | 244/118.1 |
| 2011/0084172 A1 * | 4/2011 | Fairchild | B64D 9/00 | 244/137.1 |
| 2011/0315822 A1 * | 12/2011 | Fairchild | B60J 5/062 | 244/129.5 |
| 2014/0054417 A1 * | 2/2014 | Spellman | B64D 11/00 | 244/118.5 |
| 2014/0064827 A1 * | 3/2014 | Korenromp | B64D 11/00 | 403/63 |
| 2014/0306060 A1 * | 10/2014 | Schomacker | B60N 2/07 | 244/118.6 |
| 2015/0108273 A1 * | 4/2015 | Oleson | B64C 1/18 | 244/120 |
| 2015/0225083 A1 * | 8/2015 | Gutenkunst | B64D 9/003 | 244/137.1 |
| 2015/0344124 A1 * | 12/2015 | Liu | B64C 1/18 | 244/131 |
| 2015/0367931 A1 * | 12/2015 | Cullen | B64D 9/003 | 244/118.1 |
| 2016/0009421 A1 * | 1/2016 | Oberoi | B29C 45/14336 | 269/17 |

\* cited by examiner

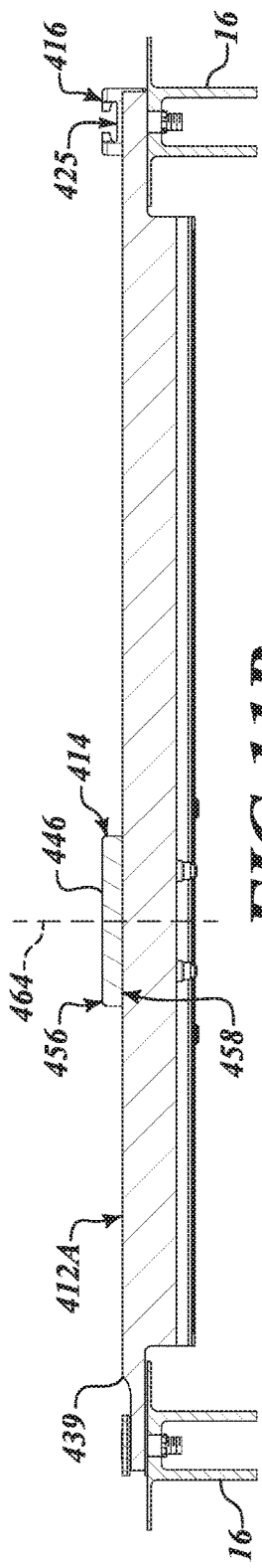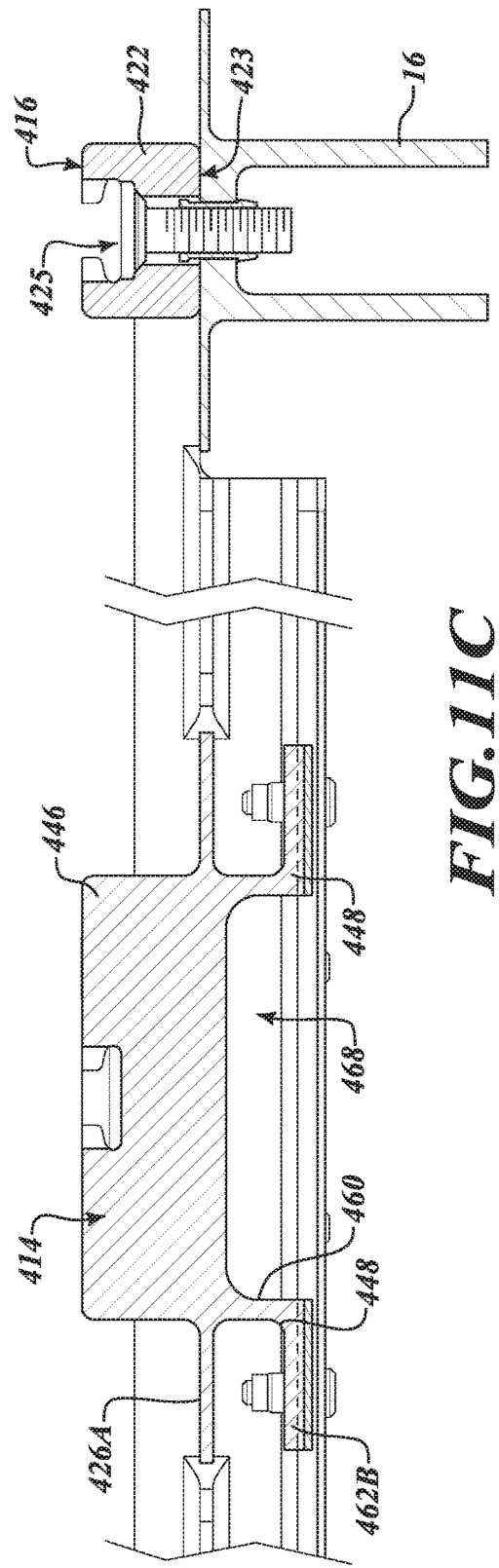

AIRCRAFT INTERIOR FLOORING SYSTEMS

CROSS-REFERENCE TO RELATED APPLICATIONS

This application is a divisional of U.S. patent application Ser. No. 14/747,987 filed Jun. 23, 2015, now allowed, which claims the benefit of U.S. Provisional Patent Application No. 62/016,002, filed Jun. 23, 2014, all of which applications are hereby incorporated by reference in their entireties.

BACKGROUND

Technical Field

The present disclosure generally relates to flooring systems, and more particularly to aircraft interior flooring systems.

Description of the Related Art

An aircraft floor structure is generally constructed in a grid formation. In the longitudinal direction (i.e., forward-aft direction of an aircraft fuselage), the floor structure may include a plurality of seat tracks spaced apart in the lateral direction (i.e., the left-right direction of the aircraft fuselage with respect to its longitudinal or roll axis). The seat tracks are typically mounted on floor beams, which generally extend in the lateral direction from one side of the aircraft fuselage body to the other. The floor beams are typically spaced apart in the longitudinal direction (i.e., forward-aft direction of the aircraft fuselage). A plurality of floor panels are coupled to the top of the floor structure, the floor panels generally being disposed between adjacent seat tracks.

Aircraft floor structure is generally constructed to withstand various operating conditions an aircraft experiences during its life cycle, and provide strength, stability, attachment locations, etc., for payload components to be secured to the floor structure. By way of example, the payload components that are secured to the floor structure include monuments, seat assemblies, lavatories, galleys, etc. Conventional floor structures of commercial aircraft, for example, are constructed to have fixed locations in relation to aircraft coordinates (i.e., X, Y, Z), where such payload components are to be mounted. To provide structural support at such locations, an intercostal is typically secured between adjacent seat tracks. The intercostals are positioned to mate with an upper surface of respective seat track flanges. The intercostals include interface members to mate with the payload component attachment fitting which are fixed in position and are typically formed from the same material as the corresponding intercostal.

As a result of positional rigidity of such interface members, substantial modifications to floor structures, including the floor panels are required to secure the payload components.

By way of example, the fixed location of an interface member, positioned substantially in the center of the intercostal, requires the floor panels be split or otherwise significantly altered to avoid interference, and then attached to the intercostal. Such modifications lead to increased labor and material costs, weight, inefficiencies, among other things.

Further, payload components are often positioned in customized and non-standard locations, relocated, added, re-aligned, etc. By way of example, while for commercial aircraft, payload components may be less frequently re-configured or positioned in non-standard configurations, in aircraft used for transporting VIPs, heads of states, etc., the floor structure requires substantial customization and reconfiguration, including installing multiple additional and/or different payload components, removal, addition, and/or shifting of seat assemblies. In such applications, for example, conventional floor structures require substantial modifications, thus significantly increasing costs, weight, and certification requirements, and re-certification of several aircraft components, such as the payload components, seat tracks, floor beams, etc.

BRIEF SUMMARY

According to one embodiment, an aircraft flooring system for an aircraft fuselage adapted to secure a payload component may be summarized as including first and second seat tracks extending longitudinally with respect to the aircraft fuselage, the first and second seat tracks being spaced from one another; and an intercostal assembly extending between the first and second seat tracks. The intercostal assembly can include a first intercostal having a center member having a first end and a second end, opposing the first end, and a top flange including a mounting region between the first and second ends; and at least first and second tab members. The first tab member can be coupled to the top flange toward the first end of the center member and the second tab member can be coupled to the top flange toward the second end of the center member. The first and second tab members can extend beyond the first and second ends of the center member, respectively, the first tab member configured to be coupled to the first seat track and the second tab member configured to be coupled to the second seat track.

According to another embodiment, an intercostal assembly adapted to support a payload component and configured to be coupled to a first seat track and a second seat track of an aircraft flooring system can be summarized as including a center member having a first end and a second end, opposing the first end, and a top flange including a mounting region between the first and second ends; and at least first and second tab members. The first tab member can be coupled to the top flange toward the first end of the center member and the second tab member can be coupled to the top flange toward the second end of the center member. The first and second tab members can extend beyond the first and second ends of the center member, respectively, the first tab member configured to be coupled to the first seat track and the second tab member configured to be coupled to the second seat track.

According to another embodiment, an intercostal assembly adapted to support a payload component and configured to be coupled to a first seat track and a second seat track of an aircraft flooring system can be summarized as including a first intercostal having two tab members toward respective opposing ends of the first intercostal, the two tab members of the first intercostal configured to be coupled to the first and second seat tracks respectively; and a second intercostal having two opposing tab members toward respective opposing ends of the second intercostal, the two tab members of the second intercostal configured to be coupled to the first and second seat tracks respectively, the second intercostal spaced from the first intercostal when installed in the aircraft flooring system. The intercostal assembly may further include a third intercostal extending between the first and second intercostals and having two opposing tab members toward respective opposing ends of the third intercostal, the two tab members of the third intercostal configured to be coupled to the first and second intercostals respectively; and a first payload coupling adaptor positioned toward an upper region of the first intercostal between the first and second tab members.

BRIEF DESCRIPTION OF THE SEVERAL VIEWS OF THE DRAWINGS

FIG. 11B is a cross-sectional view of the aircraft flooring system illustrated in FIG. 11A, taken along lines 11B-11B.

FIG. 11C is a cross-sectional view of the aircraft flooring system illustrated in FIG. 11A, taken along lines 11C-11C.

DETAILED DESCRIPTION

It will be appreciated that, although specific embodiments of the subject matter of this application have been described herein for purposes of illustration, various modifications may be made without departing from the spirit and scope of the disclosed subject matter. Accordingly, the subject matter of this application is not limited to the specific embodiments described in this disclosure.

In the following description, certain specific details are set forth in order to provide a thorough understanding of various aspects of the disclosed subject matter. However, the disclosed subject matter may be practiced without these specific details. In some instances, well-known structures and methods of attaching structures have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, particular features, structures, or characteristics may be combined in any suitable manner in one or more aspects of the present disclosure.

Figure 1:
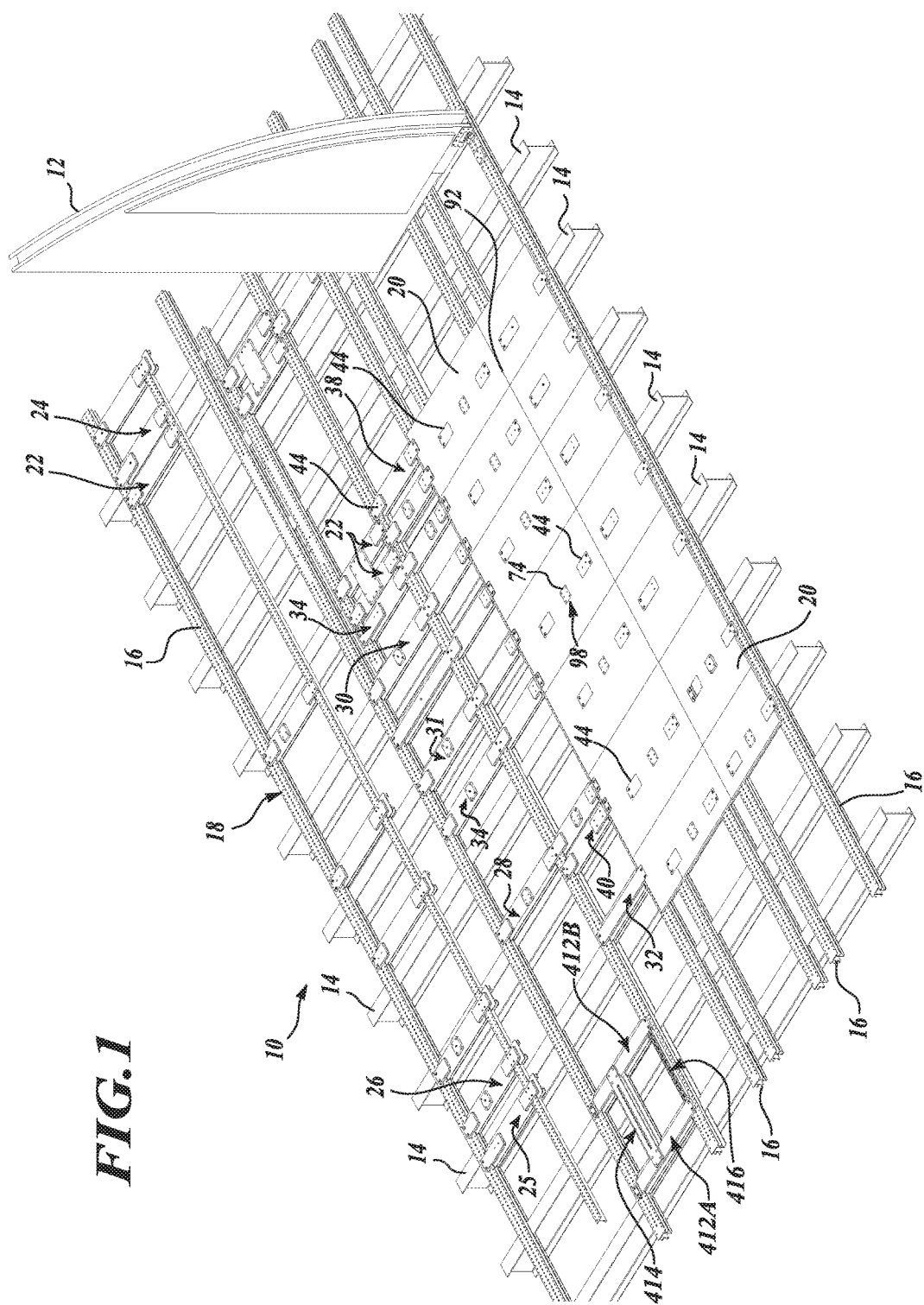
FIG. 1 is a partial perspective view of an aircraft flooring system according to one embodiment, with certain components removed for clarity.
Figure 2:
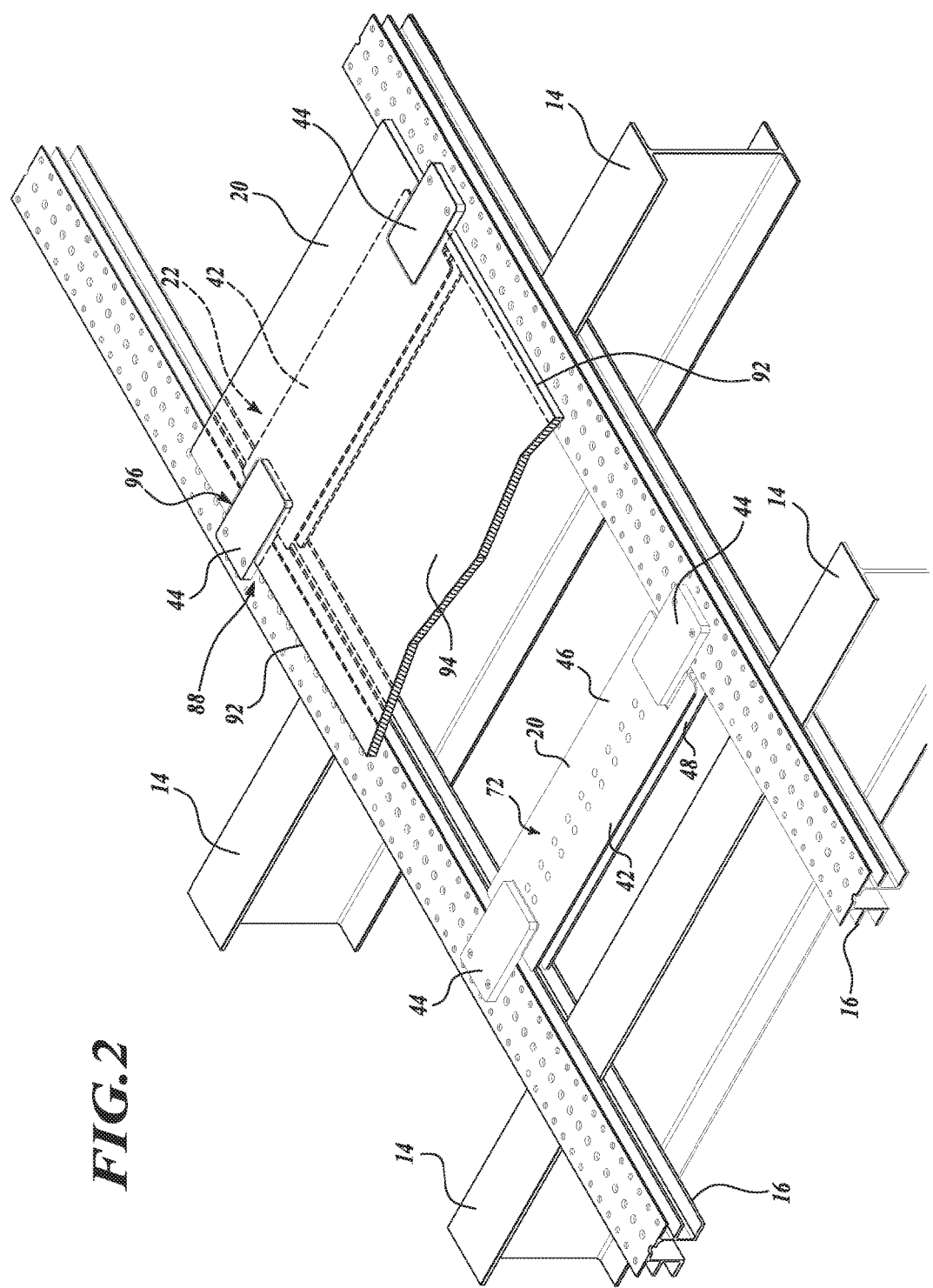
FIG. 2 is an enlarged partial perspective view of a portion of the aircraft flooring system of FIG. 1.
Figure 3:
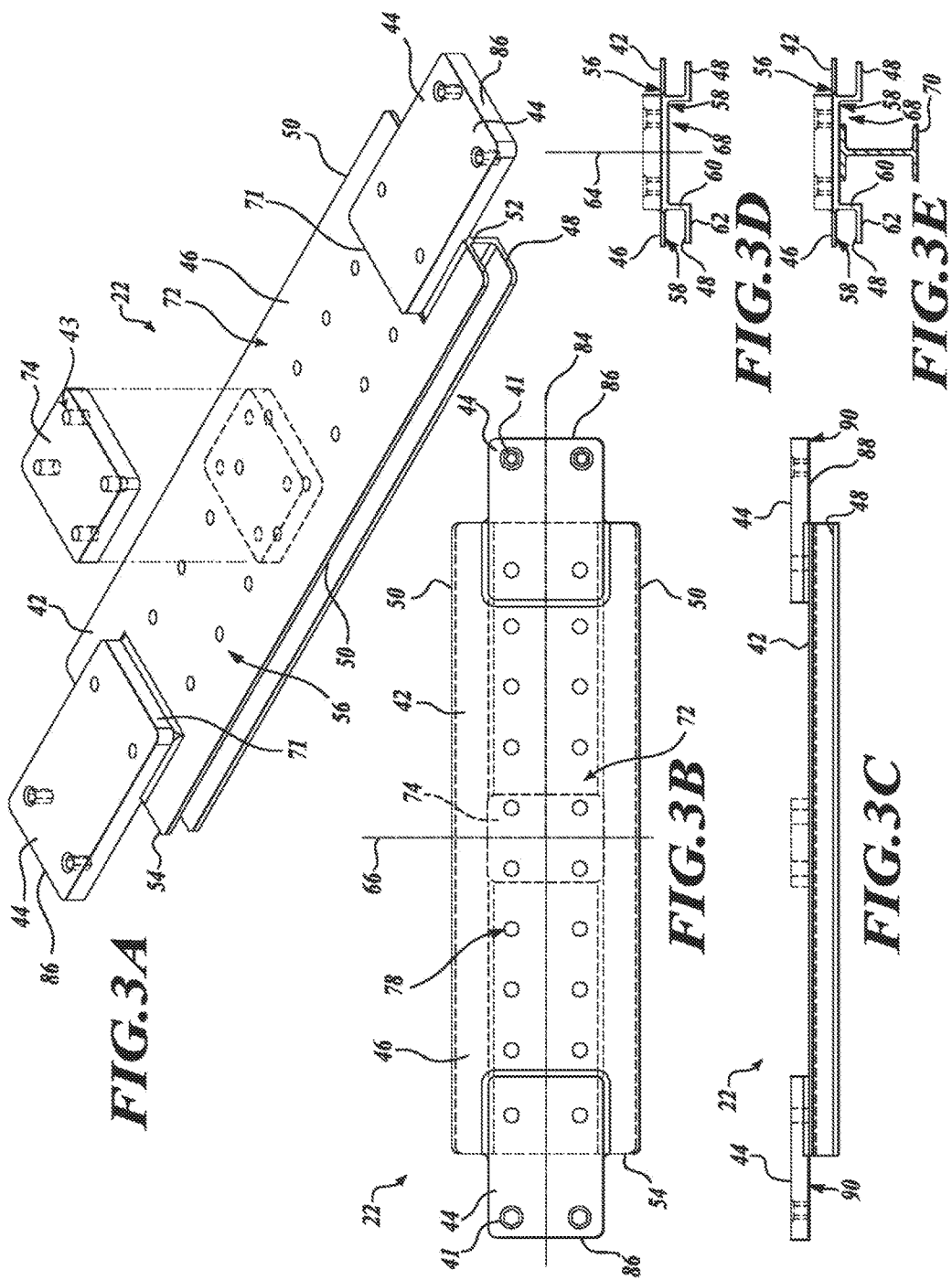
FIG. 3A is an isometric view of an intercostal illustrated in FIG. 2, according to one embodiment.
FIG. 3B is a top elevational view of the intercostal of FIG. 3A.
FIG. 3C is a front elevational view of the intercostal of FIG. 3A.
FIG. 3D is a side elevational view of the intercostal of FIG. 3A.
FIG. 3E is a side elevational view of the intercostal of FIG. 3A with a reinforcement member according to one aspect.

FIGS. 1 and 2 generally illustrate an aircraft flooring system 10 according to an example embodiment including a payload component 12 mounted thereon, with certain components having been removed for clarity. The aircraft flooring system 10 includes a plurality of spaced apart floor beams 14 extending laterally with respect to an aircraft fuselage longitudinal or roll axis, e.g., left-right direction, and a plurality of seat tracks 16 extending longitudinally with respect to the aircraft fuselage, e.g., forward-aft direction or parallel to the fuselage longitudinal or roll axis, to define a flooring grid 18. A plurality of floor panels 20 are secured to the seat tracks 16. The floor panels 20 may extend in the lateral direction between a pair of adjacent or intermediate seat tracks 16 or may extend laterally between multiple seat tracks 16.

In general, the flooring grid 18 is constructed to provide structural strength and stability to the fuselage and payload components (e.g., 12) that may be mounted thereon. In one embodiment, intercostals (e.g., 22, 24, 25, 26, 28, 30, 31, 32, 34, 38, 40, etc.) are coupled to the seat tracks 16 to provide support at locations where the payload components 12 are to be mounted. By way of example, FIG. 2 illustrates intercostals 22, according to one embodiment, coupled to a pair of adjacent seat tracks 16 and the floor panel 20.

Referring now to FIG. 2 and FIGS. 3A-3E, the intercostal 22 includes a center member 42 and a pair of coupling members or tab members 44. For clarity and without intention to limit the coupling or tab members, the coupling members will be referred to herein as tab members 44. In one embodiment, center member 42 includes a top flange 46 and a pair of stiffeners 48. In one aspect, the top flange 46 is substantially rectangular shaped and includes a pair of substantially parallel opposing side edges 50, a first end 52 and a second end 54 extending between the side edges 50 to define an external boundary. In one aspect, the top flange 46 includes a top surface 56 and a bottom surface 58.

In one embodiment, as noted above, the center member 42 includes a pair of stiffeners 48. The stiffeners 48 in one aspect can be substantially L-shaped and include an upstanding flange 60 and a base flange 62. The upstanding flange 60 in one embodiment can extend vertically from the bottom surface 58 along a vertical axis 64 of the intercostal 22.

In one embodiment, the base flange 62 extends, for example at a substantially perpendicular angle, from a lower edge of the upstanding flange 60 along a first axis 66 of the intercostal 22. In one aspect, the upstanding flange 60 of the stiffener 48 can be selectively sized and shaped to extend vertically a certain distance and have certain dimensions (e.g., thickness, width, etc.).

In one embodiment, the base flange 62 of the stiffener 48 is selectively sized and shaped to extend longitudinally (i.e., with respect to the Intercostal 22 parallel to a second axis 84) a certain distance and have certain dimensions (e.g., thickness, width, etc.). In this manner, the stiffener 48 is selectively and optimally sized and shaped to provide structural rigidity to the intercostal 22 while avoiding adverse interference with adjacent structures, such as floor beams 14, floor panels 20, wiring, plumbing, etc. While embodiments of the intercostal illustrated in FIGS. 1 through 10 include a pair of L-shaped stiffeners 48, in other embodiments, stiffeners may have different shapes (i.e., I-shaped, hat-shaped, Z-shaped, etc.).

In one embodiment, the stiffeners 48 are spaced apart with respect to the vertical axis 64 and are a mirror image of one another with respect to the vertical axis 64 to define a reinforcement member cavity 68. In one embodiment, the reinforcement member cavity 68 is configured to receive therein a reinforcement member 70. By way of example, according to one embodiment, FIG. 3E partially illustrates a reinforcement member 70 which has a substantially I-shaped cross-section. In one embodiment, a top flange of the reinforcement member 70 is sized and shaped to be received in the reinforcement member cavity 68 and mate with the bottom surface 58 of the top flange 46. In one aspect, the stiffeners 48 are selectively and optimally spaced apart with respect to the vertical axis 64 to provide structural rigidity and avoid interference, and form the reinforcement member cavity 68 to optionally include additional reinforcement members 70.

With continued reference to FIGS. 2 and 3A-3E, each of the pair of tab members 44 extend laterally in an opposite direction with respect to the first axis 66 of the intercostal 22. According to one embodiment, in the vertical direction, the tab members 44 extend upwardly with respect to the top surface 56 of the top flange 46. In one aspect, the tab members 44 are substantially rectangular shaped and include respective first ends 71 located proximal to the corresponding first and second edges 52, 54, at least a portion of the center member 42 therebetween, defining a mounting region 72.

The mounting region 72 is in one embodiment arranged to selectively position the payload component 12 to be coupled to the intercostal 22. In one embodiment the intercostal may include or be coupled to an interface fitting 74.

Figure 4:
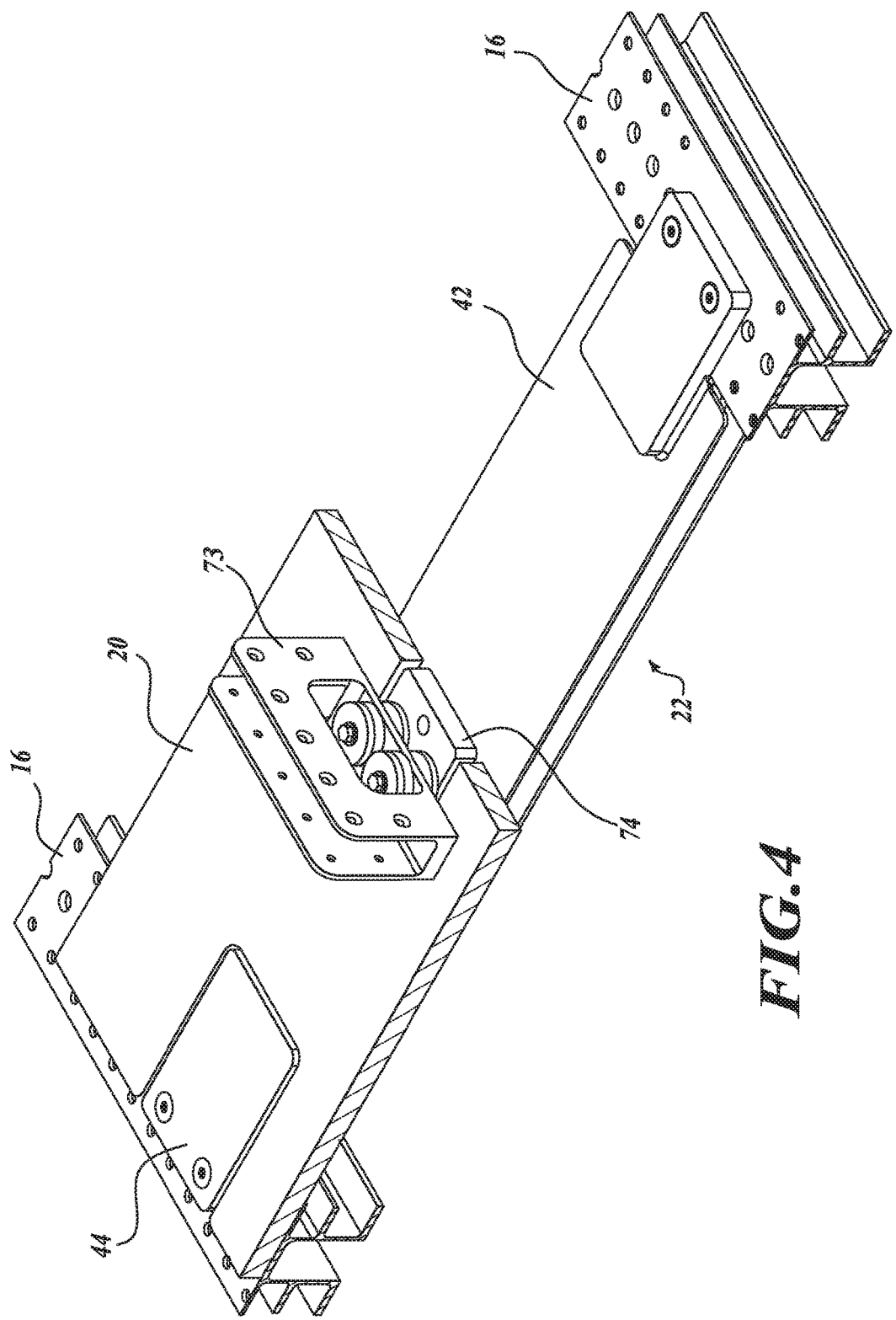
FIG. 4 is an enlarged partial perspective view of a portion of the aircraft flooring system of FIG. 1, according to one embodiment.

By way of example, FIG. 4 illustrates a payload component fitting 73 according to one aspect, configured to couple the payload component 12 to the aircraft flooring system 10 (FIG. 1) through the interface fitting 74 (FIG. 3A). The interface fitting 74 can advantageously be selectively located within the mounting region 72 (FIG. 3A).

In one embodiment, as illustrated in FIGS. 3A and 3B, the mounting region 72 may include coupling features, such as, for example, a plurality of apertures 78 extending through the top flange 46 of the center member 42. The apertures 78 can be arranged to be located anywhere within the mounting region 72, such that the interface fitting 74 can be selectively located or relocated within the mounting region 72. By way of example, the interface fitting 74 can include interface fitting coupling features, such as, for example, interface fitting apertures 43. The interface fitting apertures 43 are configured to allow the interface fitting 74 to be removably coupled to the intercostal 22. Thus, the payload component 12 can be selectively coupled to the aircraft flooring system 10 (FIG. 1) via fasteners extending through the payload component fitting 73 and the interface fitting 74.

Figure 5:
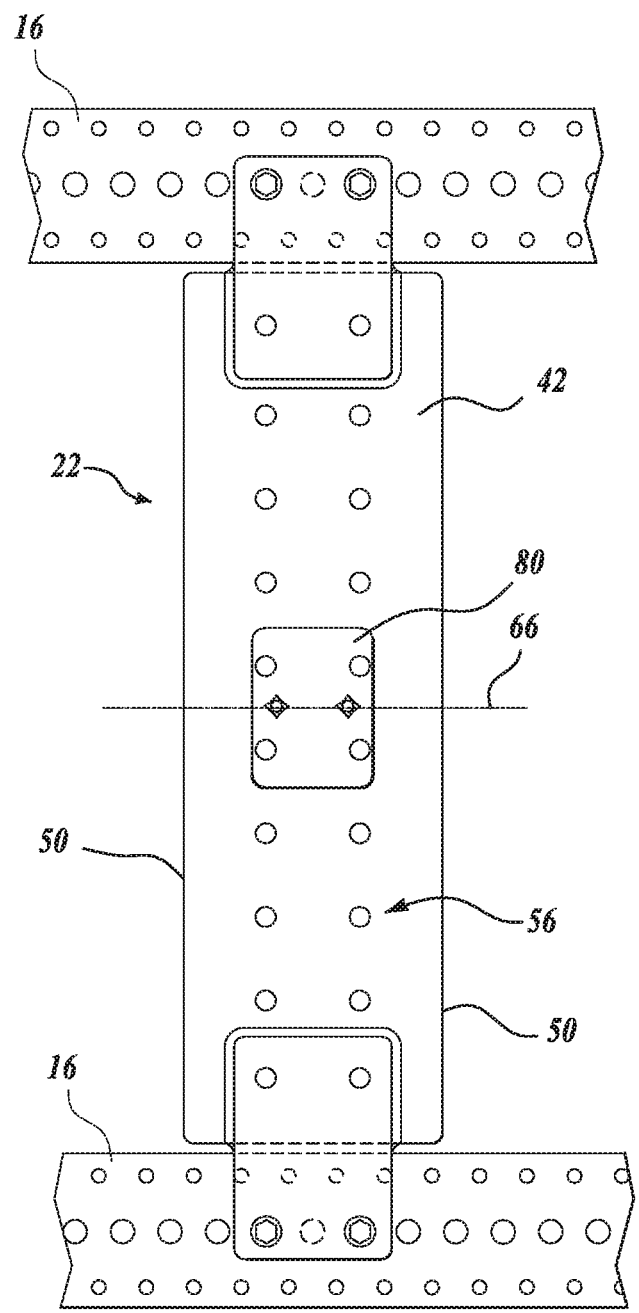
FIG. 5 is an enlarged partial top elevational view of a portion of the aircraft flooring system of FIG. 1, according to one embodiment.

Moreover, the mounting region 72 in one embodiment allows various interface fittings with a wide variety of orientations, shapes, and sizes to be mounted within the mounting region 72. By way of example, FIG. 5 illustrates the intercostal 22 removably coupled to an interface fitting 80, according to one embodiment.

According to one aspect, the interface fitting 80 can be oriented with two opposing edges thereof extending substantially parallel to the side edges 50 of the center member 42 (e.g., rotated 90 degrees with respect to the first axis 66 of the intercostal 22).

Figure 6:
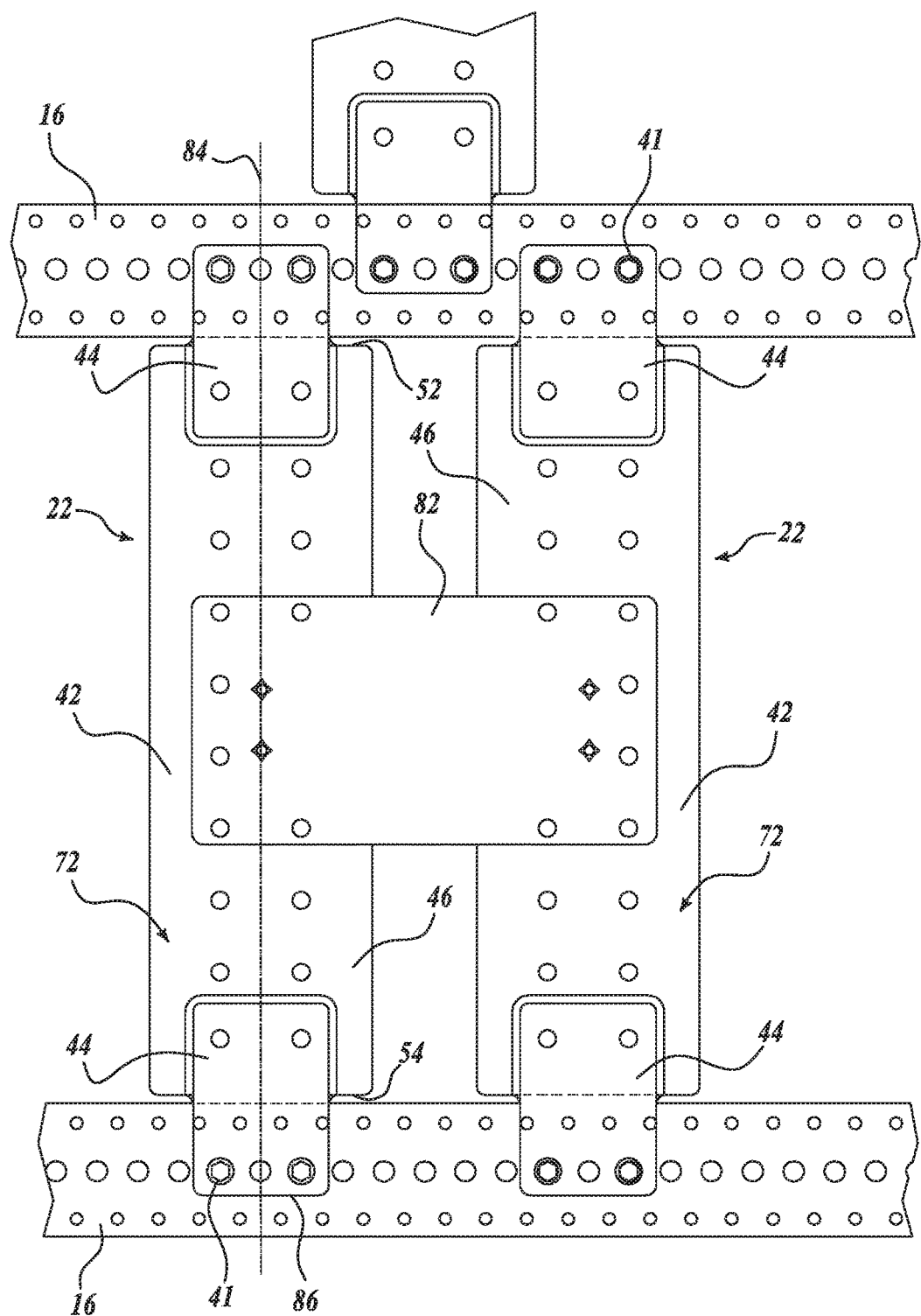
FIG. 6 is an enlarged partial top elevational view of a portion of the aircraft flooring system of FIG. 1, according to one embodiment.

According to one embodiment, FIG. 6 illustrates an enlarged partial view of an arrangement of a pair of intercostals 22 located adjacent to one another and coupled to two seat tracks 16. In one aspect, this arrangement includes an interface fitting 82 according to one embodiment. In one aspect, the interface fitting 82 extends from one intercostal 22 to the other adjacent intercostal 22. The interface fitting 82 can be oriented and arranged to be mounted to adjacent mounting regions 72 of the respective intercostals 22.

In various embodiments, the mounting regions 72 of the intercostals 22 can be configured to be removably coupled to a wide variety of interface fittings, which can be shaped, arranged and/or oriented in any manner desired, which allows the payload component 12 and its payload component fitting 73 to be selectively arranged, moved, located, or relocated to any desired position.

In one embodiment, the tab members 44 extend outwardly from the respective first ends 71 along the second axis 84 of the intercostal 22 toward a respective second end 86. In one aspect, the tab members 44 protrude from the respective first and second edge 52, 54 of the top flange 46 of the center member 42 to define a mating region 88 (FIG. 3C). In one embodiment, the mating region 88 is located in a lower surface 90 (FIG. 3C) of the tab members 44 and is configured to be coupled to a top surface of the seat track 16 (e.g., top surface of a top seat track flange).

In one aspect, the tab members 44 also include coupling features, such as, for example, a plurality of seat track apertures 41. The seat track apertures 41 are located in the mating region 88 and extend through the tab members 44. In one embodiment, the seat track apertures 41 can have a substantially hexagonal shape and be configured to receive therethrough corresponding fasteners to couple the tab members 44 to the seat tracks 16. It is appreciated that in some embodiments, the seat track apertures 41 may comprise different shapes, such as circular, for example.

In one embodiment, the intercostal 22 can be monolithically formed, comprising an integral or unitary body. For example, the intercostal 22 can be formed using a machining process, extrusion process, molding process (e.g., injection molding processes), vacuum forming (e.g., vacuum bag molding), combinations thereof, or the like. However, it is appreciated that embodiments of the intercostal 22 comprising separate components coupled together are also within the spirit and scope of the disclosed subject matter.

With reference to FIGS. 1 through 3E, in one embodiment, the floor panels 20 extend laterally to at least a pair of adjacent seat tracks 16 and are coupled thereto. In one aspect, the lower surface of the floor panel 20 is coupled to the top surface of the seat track 16. In one aspect, the floor panel 20 includes end regions 92 located at opposing ends of the floor panels 20 and a center region 94 located between the end regions 92. In one embodiment, the end regions 92 include notches 96 located proximal to the tab members 44.

The notches 96 in some embodiments can include respective outer profiles located at a periphery of the notches 96. The outer profiles of the notches 96 can in some aspects be sized and shaped to enclose, be positioned adjacent to, and/or substantially circumscribe an outer profile of the respective tab members 44. As best illustrated in FIG. 1, in some embodiments, the center regions 94 of the floor panels 20 can include a center notch 98 located proximal the mounting region 72. The center notch 98 in one embodiment includes respective outer profiles located at a periphery of the center notch 98. In some aspects, outer profiles of the center notch 98 can be sized and shaped to enclose, be positioned adjacent to, and/or substantially circumscribe an outer profile of the interface fitting 74.

In some embodiments, as illustrated in FIG. 2, the center region 94 of the floor panel 20 can extend continuously between the end regions 92 such that the lower surface of the floor panel in the center region 94 substantially abuts or contacts, or is otherwise adjacent, the mounting region 72 (FIGS. 3A and 3B) of the intercostal 22. In this manner, having a mounting region 72 capable of excluding an interface fitting (e.g., 76) provides significant manufacturing and assembly flexibility, thus resulting in cost savings, such as manufacturing and labor costs, for example. Further, unnecessarily reinforcing the floor panels with additional structure, expending resources (e.g., engineering) re-designing and/or analyzing, or re-certifying the floor panels to meet certain regulatory requirements can advantageously be avoided by selectively excluding, locating, or relocating interface fittings.

Figure 7A:
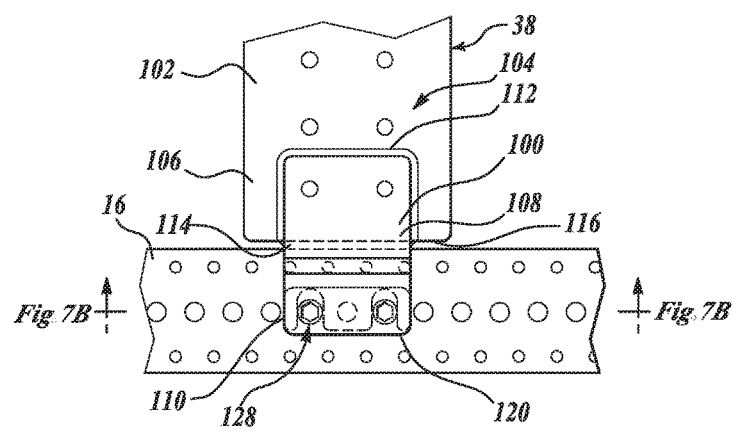
FIG. 7A is an enlarged partial top elevational view of a portion of the aircraft flooring system of FIG. 1, according to one embodiment.
Figure 7B:
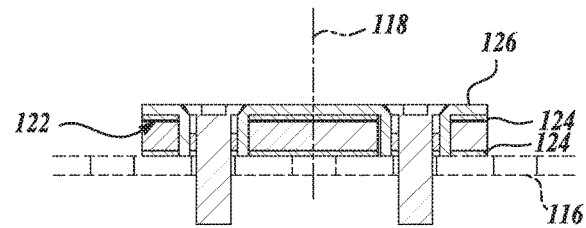
FIG. 7B is a cross-sectional view of the aircraft flooring system illustrated in FIG. 1, taken along lines 7B-7B.

FIG. 7A is an enlarged partial plan view of a portion of the aircraft flooring system 10 (FIG. 1). FIG. 7B is a cross-sectional view taken along Section 7B-7B in FIG. 7A. FIGS. 7A and 7B illustrate an intercostal 38 according to another embodiment. The intercostal 38 provides a variation in which the intercostal 38 includes one tab member 44 (FIG. 1) at one end and a slideable tab member 100 at the other end. The tab member 44 is configured to be coupleable to the seat track 16, for example, fixedly coupleable thereto. In one embodiment, the tab member 44 and the slideable tab member 100 extend laterally in an opposite direction with respect to a longitudinal axis of the intercostal 38 in a manner similar to that described previously with respect to the other embodiments.

In the vertical direction, the slideable tab member 100 extends upwardly with respect to a top surface 104 of a top flange 102 of the center member 106 of the intercostal 38. In one aspect, the slideable tab member 100 includes an interface portion 108 and a slipped end portion 110. The interface portion 108 can be substantially rectangular shaped and include a first end 112 located toward a central region of the center member 106 of the intercostal 38 and a second end 114 located proximal to a first edge 116 of the center member 106. In one embodiment, the slipped end portion 110 extends away from the second end 114 of the interface portion 108 and gradually tapers downwardly along a vertical axis 118 of the intercostal 38.

According to one embodiment, the slipped end portion 110 protrudes outwardly from the second end 114 of the interface portion 108 extending to a slipped end 120 to define a mating region 122 of the slideable tab member 100. In one aspect, the mating region 122 is located proximal a lower surface of the slideable tab member 100 and a top surface of the seat track 16 when the intercostal 38 is coupled to the seat track 16. In one embodiment, the intercostal 38 optionally includes a pair of mating plates 124 and a washer plate 126. The mating plates 124 may be fabricated from a suitable material, including but not limited, to nylon, various polymers, or any other material having suitable reduced friction or non-friction properties. The washer plate 126 may be fabricated from a suitable material, including but not limited, to steel, aluminum, titanium, various polymers, or any other suitable material. One of the mating plates 124 is positioned between the lower surface of the slideable tab member 100 and the top surface of the seat track 16 and the other mating plate 124 is positioned between the washer plate 126 and a top surface of the slideable tab member 100 to define a multi-layered connection of the intercostal 38 to the seat track 16 at one end of the intercostal 38.

In one embodiment, proximal the slipped end 120 of the slipped end portion 110, the slipped end portion 110 includes a pair of spaced apart slideable notches 128. The slideable notches 128 in some aspects can be substantially horseshoe shaped and extend toward the slipped end 120 of the slipped end portion 110 to define respective free edges. The horseshoe shaped slideable notches 128 advantageously allow the intercostal 38 to be slideably coupled to the seat track 16. In this manner, the intercostal 38 is moveable in the lateral direction while being substantially restrained in the longitudinal direction. Consequently, the intercostal 38 can advantageously allow for relative lateral movement of adjacent seat tracks 16, which may be caused due to aircraft fuselage deflection. Further, the slideable tab member 100 can improve assembly processes of the intercostal 38 by allowing the intercostal 38 to be moveable in the lateral direction to minimize or limit effects of eccentricities that may result due to manufacturing tolerances and/or defects.

Figure 8:
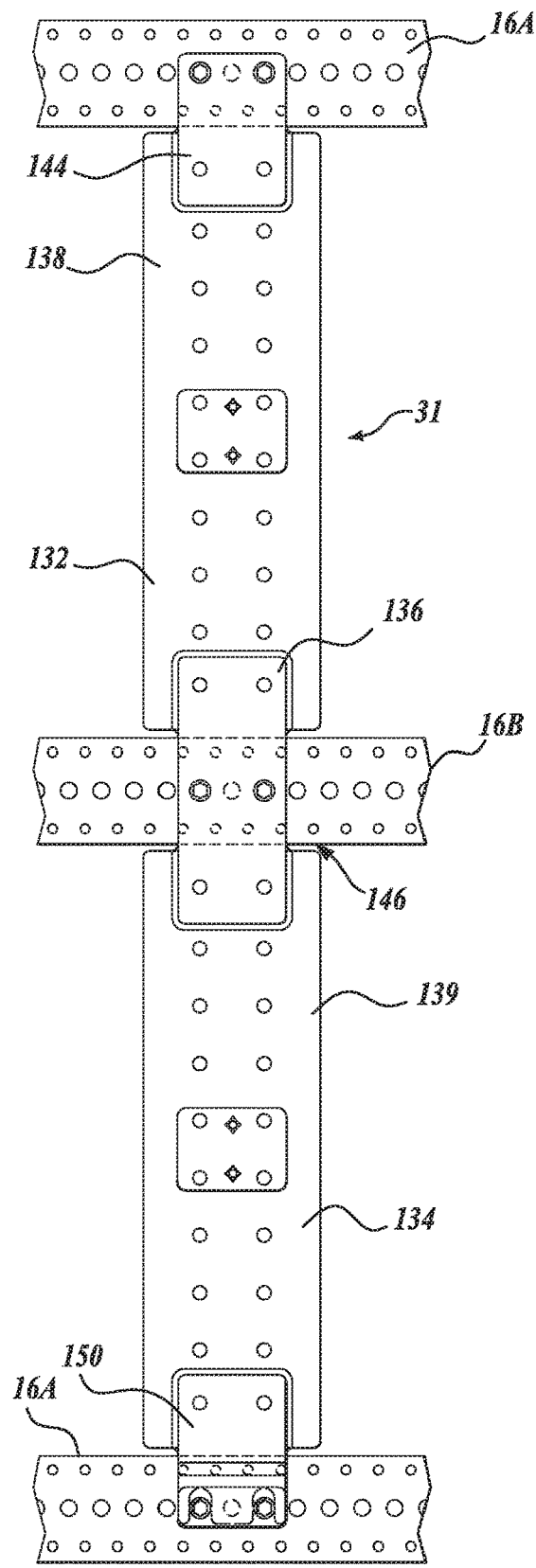
FIG. 8 is an enlarged partial perspective view of a portion of the aircraft flooring system of FIG. 1, according to one embodiment.

FIG. 8 is an enlarged partial view of a portion of the aircraft flooring system 10 (FIG. 1) illustrating an intercostal 31 according to one embodiment. The intercostal 31 of the illustrated embodiment of FIG. 8 provides a variation in which the intercostal 31 extends between a pair of end seat tracks 16A and an intermediate seat track 16B located between the pair of end seat tracks 16A. The intercostal 31 in one aspect includes a first portion 132, a second portion 134, and an intermediate tab member 136 located in between the first and second portions 132, 134. The first and second portions 132, 134 include respective center members 138, 139. According to one aspect, the first portion 132 includes a tab member 144 and the second portion 134 includes a slideable tab member 150. The center members 138, 139, the tab member 144, and the slideable tab member 150 in some embodiments are generally similar to those respectively described previously according to other embodiments.

In one aspect, the first and second portions 132, 134 are spaced apart to define a receiving cavity 146. The receiving cavity 146 can be sized and shaped to receive therein the intermediate seat track 16B. According to one embodiment, the tab member 144, the slideable tab member 150, and the intermediate tab member 136 extend upwardly in a vertical direction with respect to top surfaces of center members 138, 139 of the first and second portions 132, 134 of the intercostal 31 such that respective lower surfaces of the tab member 144 and the slideable tab member 150 substantially abut or contact a top surface of the end seat tracks 16A, and a lower surface of the intermediate tab member 136 substantially abuts or contacts a top surface of the intermediate seat track 16B when the intercostal 31 is coupled to the end and intermediate seat tracks 16A, 16B.

In this variation of the intercostal 31, the tab member 144 and the intermediate tab member 136 are fixedly coupled to one of the end seat tracks 16A and the intermediate seat track 16B, respectively. The slideable tab member 150 is slideably coupled to the other end seat track 16A. In this manner, the intercostal 31 can advantageously be moveable in the lateral direction and be restrained in the longitudinal direction.

In other embodiments, the intermediate tab member can be configured to be slideable depending on the level of movement anticipated or desired.

Figure 9:
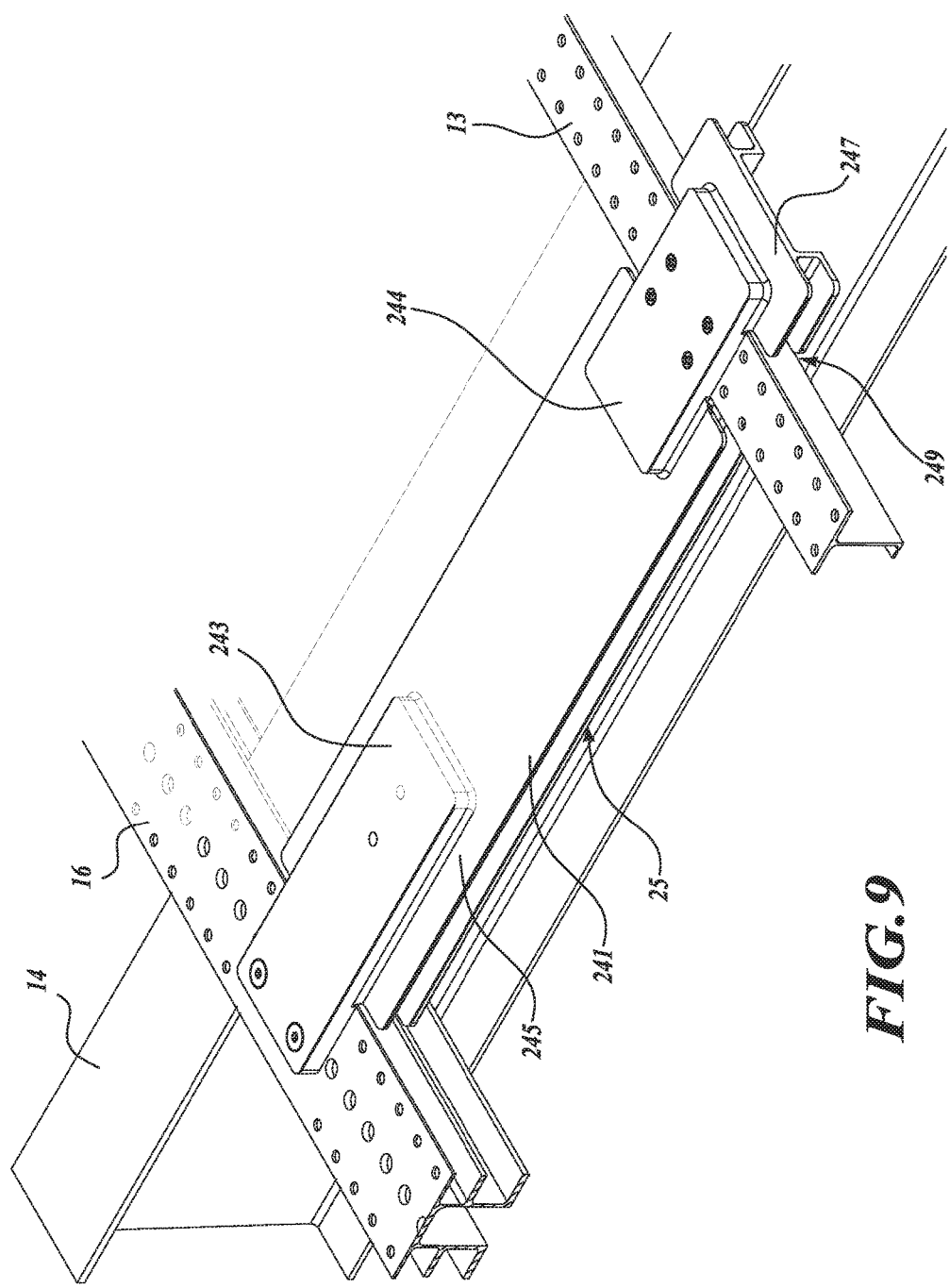
FIG. 9 is an enlarged partial perspective view of a portion of the aircraft flooring system of FIG. 1, according to one embodiment.

FIG. 9 is an enlarged partial view of a portion of the aircraft flooring system 10 (FIG. 1) illustrating an intercostal 25 according to one embodiment. In the illustrated embodiment of FIG. 9, the intercostal 25 provides a variation in which the intercostal 25 includes a center member 241 having a first portion 245 and a second portion 247. The first and second portions 245, 247 are spaced apart to define a cavity 249. The cavity 249 of the intercostal 25 is configured to receive therein a floor panel support beam 13. In one aspect, the intercostal 25 includes an elongated tab member 243 at one end of the intercostal 25 coupled to a seat track 16 and a tab member 244 at the other end of the intercostal 25. The elongated tab member 244 extends further inward toward a center of the intercostal 25 as compared to the tab member 244. In one embodiment, the tab member 244 extends between the first and second portions 245, 247 and can be configured such that a lower surface of the tab member 244 substantially abuts or contacts a top surface of the floor panel support beam 13 when the intercostal 25 is coupled to the seat track 16 and the floor panel support beam 13.

Figure 10:
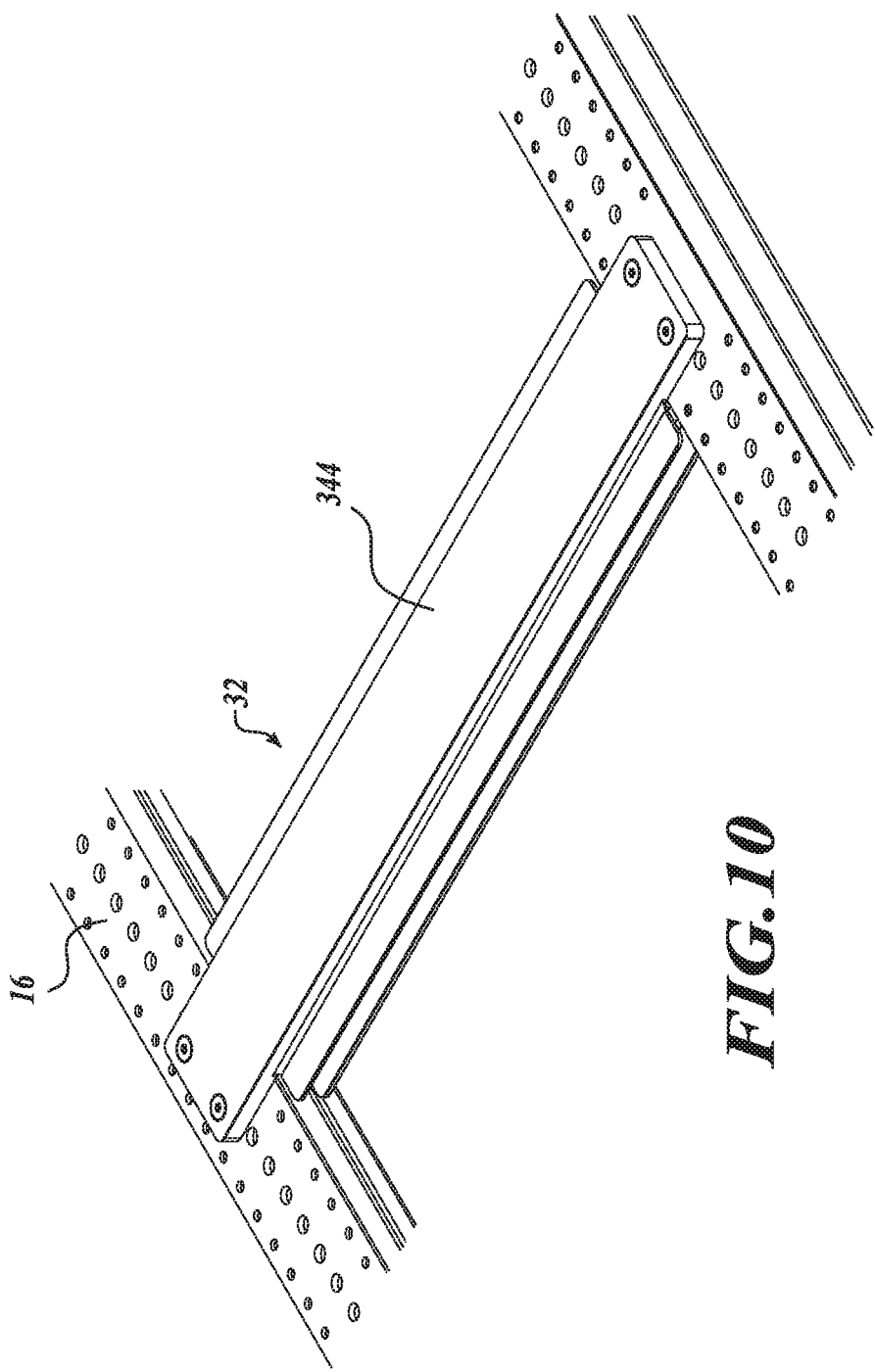
FIG. 10 is an enlarged partial perspective view of a portion of the aircraft flooring system of FIG. 1, according to one embodiment.

FIG. 10 is an enlarged partial view of a portion of the aircraft flooring system 10 (FIG. 1) illustrating an intercostal 32 according to yet another embodiment. In the illustrated embodiment of FIG. 10, the intercostal 32 provides a variation in which the intercostal 32 includes a spanning tab member 344. The spanning tab member 344 extends between opposite ends of the intercostal 32. In this variation of the intercostal 32, an interface fitting (e.g., 76) can be excluded or avoided, as the payload component fitting (e.g., 73) can be directly mounted to the intercostal 32. Moreover, in a similar manner, in the various embodiments of the intercostals discussed previously, in some embodiments the payload component fittings can be directly mounted to tab members, slideable tab members, intermediate tab members, etc., in lieu of mounting the payload component fittings to the intercostals through the interface fitting.

Figure 11A:
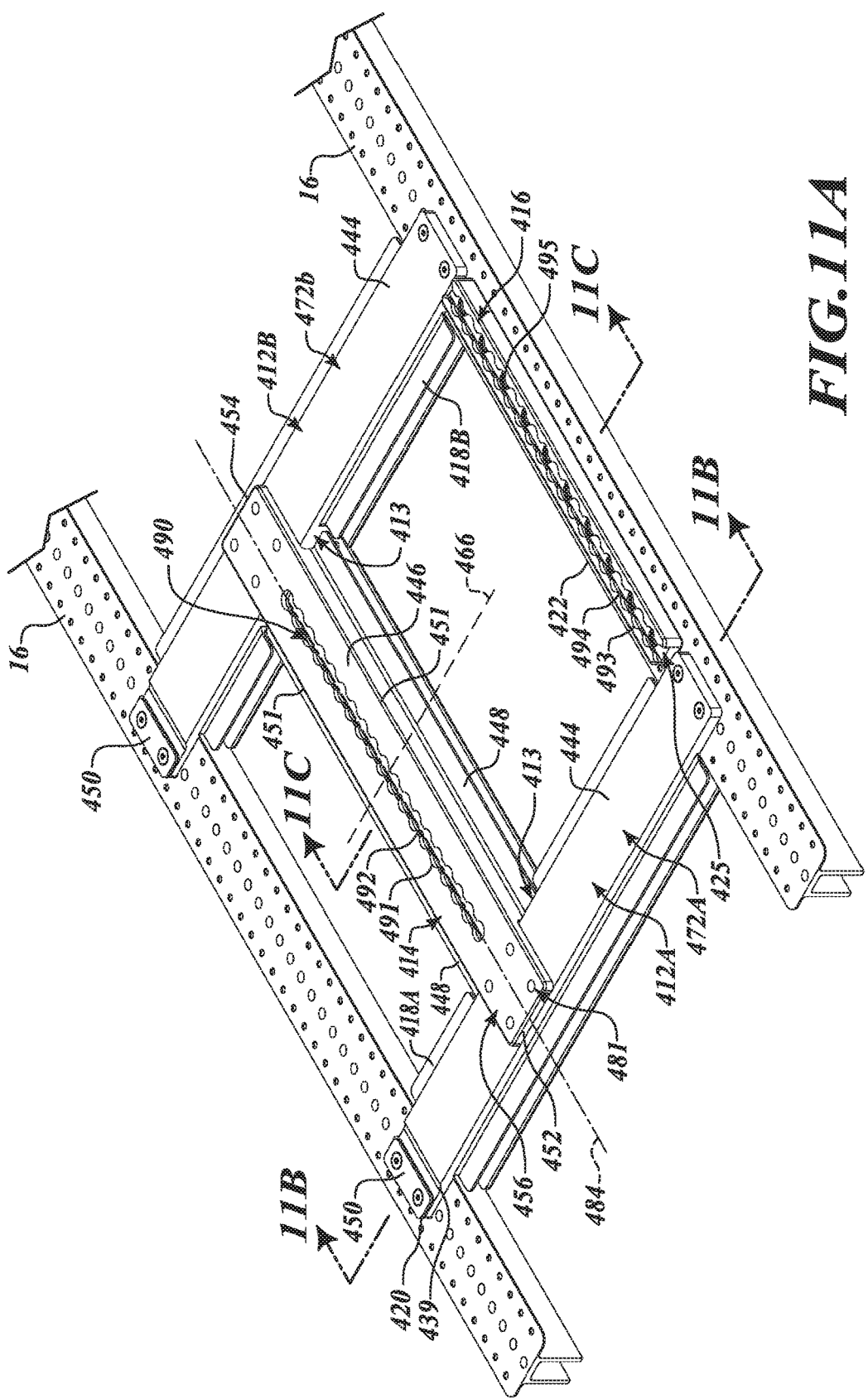
FIG. 11A is an enlarged partial perspective view of a portion of the aircraft flooring system of FIG. 1, according to one embodiment.

FIG. 11A is an enlarged partial view of a portion of the aircraft flooring system 10 (FIG. 1) illustrating an arrangement of a pair of intercostals 412A, 412B located adjacent to one another and coupled to two seat tracks 16. FIGS. 11B and 11C are cross-sectional views taken along lines 11B-11B and 11C-11C, respectively, of the partial view of the aircraft flooring system 10 shown in FIG. 11A. In one aspect, this arrangement includes a first payload coupling adaptor 414 coupled to the intercostals 412A, 412B and a second payload coupling adaptor 416 coupled to one of the seat tracks 16.

More particularly, this arrangement is adapted to advantageously allow payload components of a wide variety of commercial aircraft to be used, re-used, and/or positioned in a customized manner. For instance, payload components, such as aircraft seats, for example, are often modified, upgraded, or re-designed to be used in connection with different models of commercial aircraft, which results in specific aircraft seats suitable for specific models of commercial aircraft. In such instances, aircraft seats of previous designs or ones used with previous models of commercial aircraft, for example, often cannot be re-used with newer models of commercial aircraft, or vice versa. This arrangement allows payload components, such as aircraft seats, for example, from a wide variety of commercial aircraft models to be used, re-used, and/or positioned in a customized manner, as discussed in more detail below.

In some embodiments, the first payload coupling adaptor 414 can include an intercostal, beam, fitting, and/or other suitable structure. In some embodiments, the first payload coupling adaptor 414 can include opposing tab members coupled to the first and second intercostals 412A, 412B, respectively. In one aspect, at least one of the opposing tab members of the payload coupling adaptor 414 can be slidably coupled to the corresponding one of the first and second intercostals 412A, 412B. By way of example, in some embodiments, at least one of the opposing tab members may include a slipped end portion coupleable to the corresponding intercostals 412A, 412B, such that the first payload coupling adaptor 414 can be moveable in a longitudinal direction and be restrained in the lateral direction.

In one aspect, the intercostals 412A, 412B provide a variation in which the intercostals 412A, 412B include a spanning tab member 444 and a slideable tab member 450. The spanning tab member 444 extends from one end of the intercostals 412A, 412B toward the other, opposite end of the intercostals 412A, 412B. The spanning member 444 smoothly transitions into the slideable tab member 450 through a neck down or tapering portion 439. In one aspect, the slideable tab member 450 and the spanning member 444 are generally similar to the embodiments described previously, such as, for example, slideable tab members 100, 150 and spanning tab member 344. By way of example, in one aspect, the spanning tab member 444 is fixedly coupleable to the seat track 16. By way of further example, in one aspect, the slideable tab member 450 can include a slipped end portion 420 coupleable to the seat track 16 such that the intercostals 412A, 412B are moveable in a lateral direction and can be restrained in the longitudinal direction.

In another aspect, the intercostals 412A, 412B provide a variation in which the intercostals 412A, 412B include a recess 413 located on one side thereof. The intercostal 412A includes the recess 413 located on a side 418A facing and adjacent to a side 418B of the intercostal 412B. The recesses 413 are configured to receive therein at least a portion of the first payload coupling adaptor 414.

The first payload coupling adaptor 414, according to one embodiment, includes a top flange 446 and a pair of stiffeners 448. In one aspect, the top flange 446 is substantially rectangular shaped and includes a pair of substantially parallel opposing side edges 451, a first end 452 and a second end 454 extending between the side edges 451 to define an external boundary. In one aspect, the top flange 446 includes a top surface 456 and a bottom surface 458.

The stiffeners 448 in one aspect can be substantially C-shaped and include a pair of base or lower flanges 462A, 462B and an upstanding flange 460 extending therebetween. The upstanding flange 460 in one embodiment can extend vertically from the bottom surface 458 along a vertical axis 464 of the first payload coupling adaptor 414.

In one embodiment, the base flange 462B extends, for example at a substantially perpendicular angle, from a lower edge of the upstanding flange 460 along a first axis 466 of the first payload coupling adaptor 414. The base flange 462A extends, for example at a substantially perpendicular angle, from a side edge of the top flange 446 along the first axis 466. In one aspect, the upstanding flange 460 of the stiffener 448 can be selectively sized and shaped to extend vertically a certain distance and have certain dimensions (e.g., thickness, width, etc.).

In one embodiment, the base flanges 462A, 462B and the upstanding flange 460 of the stiffener 448 are selectively sized and shaped to extend longitudinally (i.e., with respect to the first coupling adaptor 414 parallel to a second axis 484) a certain distance and have certain dimensions (e.g., thickness, width, etc.). In one aspect, the stiffener 448 extends between the adjacent intercostals 412A, 412B a certain distance such that opposing ends of the stiffeners 448 are received in the recesses 413. In one aspect, the ends of the stiffeners 448 may abut or make substantial contact with respective mating surfaces of the intercostals 412A, 412B. In another aspect, the base flange 462B includes mating regions located at opposing ends thereof and configured to couple the base flange 462B to stiffeners of adjacent intercostals 412A, 412B. While the embodiment of the first coupling adaptor illustrated in FIGS. 11A-11C includes a pair of C-shaped stiffeners 448, in other embodiments, stiffeners may have different shapes (i.e., I-shaped, hat-shaped, Z-shaped, etc.). In some embodiments, the base flange 462B can be slidably coupled to the stiffeners of adjacent intercostals 412A, 412B, at least toward one end of the base flange 462B. By way of example, in some embodiments, the base flange 462B may include a slipped end portion or other similar member that can be configured to allow movement in the longitudinal direction and be restrained in the lateral direction.

In one embodiment, the stiffeners 448 are spaced apart with respect to the vertical axis 464 and are a mirror image of one another with respect to the vertical axis 464 to define a reinforcement member cavity 468. In one embodiment, the reinforcement member cavity 468 can be configured to receive therein a reinforcement member, such as, for example, the reinforcement member 70. In one aspect, the stiffeners 448 are selectively and optimally spaced apart with respect to the vertical axis 464 to provide structural rigidity and avoid interference, and form the reinforcement member cavity 468 to optionally include additional reinforcement members.

In one aspect, the top flange 446 includes coupling features, such as, for example, adaptor apertures 481 located proximate to the first and second ends 452, 454. The adaptor apertures 481 are configured to couple the top flange 446 to adjacent intercostals 412A, 412B. More particularly, portions of the bottom surface 458 located proximate to the first and second ends 452, 454 abut or make substantial contact with mounting regions 472A, 472B of the respective intercostals 412A, 412B, when the first payload coupling adaptor 414 is coupled thereto. In one aspect, the top flange 446 includes a receptacle section 490 extending longitudinally along the second axis 484. The receptacle section 490 includes a plurality of spaced apart circular portions 491 with lip portions 492 disposed therebetween. In one aspect, the receptacle section 490 is configured to be coupled to an aircraft seat and to the flooring system 10. By way of example, an aircraft seat may include a frame having opposing ends configured to coupleably receive seat track fittings. In one aspect, the aircraft seat may include a first seat track fitting at one end of the frame which can be moveable along the length of the receptacle section 490 to position the aircraft seat during installation, relocation, or the like. The aircraft seat at the other end of the frame may include a second seat track fitting configured to be coupled to the second payload coupling adaptor 416.

In one aspect, the second payload coupling adaptor 416 includes a main body 422 having a bottom surface 423 that abuts or makes substantial contact with a mating surface of the seat track 16, when the second payload coupling adaptor 416 is coupled thereto. The main body 422 of the second payload coupling adaptor 416 includes a channel 425 extending longitudinally in a direction that is substantially parallel to the second axis 484. The channel 425 includes spaced apart circular portions 493 with lip portions 494 disposed therebetween. The channel 425 is configured to receive therethrough an aircraft seat fitting, such as the second seat track fitting discussed above, which is configured to couple an aircraft seat to the aircraft flooring system 10. The second seat track fitting, therefore, can be moveable along the length of the channel section 425 to position the aircraft seat during installation, relocation, or the like. The main body 422 further includes a plurality of adaptor apertures 495 spaced apart in the longitudinal direction. The adaptor apertures 495 are configured to couple the second payload coupling adaptor 416 to the seat track 16.

In one aspect, the first and second payload coupling adaptors 414, 416 are advantageously configured to couple aircraft seats of a wide variety of configurations to the aircraft flooring system 10. The second payload coupling adaptor 416, for example, can be adapted to receive seat track fittings of a wide variety of aircraft seats used for various commercial aircraft models. The first payload coupling adaptor 414 can be similarly adapted to receive seat track fittings of a wide variety of aircraft seats used for various commercial aircraft models. In another aspect, the first payload coupling adaptor 414 can be moved, positioned, or repositioned along the first axis 466 to match footprints of a wide variety of aircraft seats.

The various embodiments of the intercostals and payload coupling adaptor described herein can be integral or one-piece embodiments of the intercostals. The intercostals and the payload coupling adaptors can be monolithically formed using a machining process, extrusion process, molding process (e.g., injection molding processes), vacuum forming (e.g., vacuum bag molding), combinations thereof, and the like. The intercostals and the payload coupling adaptors may comprise aluminum, titanium, various metallic alloys, carbon fiber reinforced plastic, or other materials with suitable properties. Moreover, the various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An aircraft flooring system for an aircraft fuselage adapted to secure a payload component, the aircraft flooring system comprising:
   first and second seat tracks extending longitudinally with respect to the aircraft fuselage, the first and second seat tracks being spaced from one another;
   an intercostal assembly extending between the first and second seat tracks, the intercostal assembly including an intercostal having:
      a center member having a first end and a second end, opposing the first end, and a top flange including a mounting region between the first and second ends; and
      at least first and second tab members, the first tab member coupled to the top flange toward the first end of the center member, the second tab member coupled to the top flange toward the second end of the center member, the first and second tab members extending beyond the first and second ends of the center member, respectively, the first tab member configured to be coupled to the first seat track and the second tab member configured to be coupled to the second seat track, and wherein the first tab member is substantially static when coupled to the first seat track, and the second tab member is movably coupled to the second seat track, the second tab member being slideably moveable along a first axis and substantially static along a second axis, when coupled to the second seat track.

2. The aircraft flooring system of claim 1, further comprising:
at least one interface fitting positioned between the first and second tab members and coupled to the mounting region wherein the mounting region and the interface fitting each include coupling features facilitating removal and relocation of the interface fitting from a first location of the mounting region to a second location thereof.

3. The aircraft flooring system of claim 1 wherein the second tab member includes an interface portion that includes a first end located toward a central region of the center member and a second end located proximal to an edge of the center member.

4. The aircraft flooring system of claim 1 wherein the second tab member includes a slipped end portion that extends away from an edge of the center member.

5. The aircraft flooring system of claim 4 wherein the slipped end portion includes a notch that is sized and shaped to slideably couple to the second seat track.

6. The aircraft flooring system of claim 5 wherein the notch at one end has a closed face and at another, opposing end has an open face.

7. The aircraft flooring system of claim 1, further comprising:
a pair of plates, a first one of the pair of plates coupled to a top surface of the second tab member, and a second one of the pair of plates coupled to a lower surface of the second tab member and a top surface of the second seat track.

8. The aircraft flooring system of claim 7, further comprising:
a washer plate coupled to the first one of the pair of plates.

9. The aircraft flooring system of claim 1, further comprising:
at least one flange extending away from the top flange on opposing lateral sides of the top flange and forming opposing first and second stiffeners and forming a reinforcement cavity therebetween.

10. An intercostal assembly adapted to support a payload component, the intercostal assembly configured to be coupled to a first seat track and a second seat track of an aircraft flooring system, the intercostal assembly including an intercostal comprising:
a center member having a first end and a second end, opposing the first end, and a top flange including a mounting region between the first and second ends; and
at least first and second tab members, the first tab member coupled to the top flange toward the first end of the center member, the second tab member coupled to the top flange toward the second end of the center member, the first and second tab members extending beyond the first and second ends of the center member, respectively, the first tab member configured to be coupled to the first seat track and the second tab member configured to be coupled to the second seat track, wherein the first tab member of the intercostal is substantially static when coupled to the first seat track, and the second tab member of the intercostal is movably coupled to the second seat track, the second tab member of the intercostal being slideably moveable along a first axis and substantially static along a second axis, when coupled to the second seat track.

11. The intercostal assembly of claim 10 wherein the second tab member includes a slipped end portion that extends away from an edge of the center member.

12. The intercostal assembly of claim 11 wherein the slipped end portion includes a notch that is sized and shaped to slideably couple to the second seat track.

13. The intercostal assembly of claim 12 wherein the notch at one end has a closed face and at another, opposing end has an open face.

14. The intercostal assembly of claim 10, further comprising:
at least one flange extending away from the top flange on opposing lateral sides of the top flange and forming opposing first and second stiffeners and forming a reinforcement cavity therebetween.

15. The intercostal assembly of claim 10, further comprising:
a pair of plates, a first one of the pair of plates coupled to a top surface of the second tab member, and a second one of the pair of plates coupled to a lower surface of the second tab member and a top surface of the second seat track.

16. The intercostal assembly of claim 15, further comprising:
a washer plate coupled to the first one of the pair of plates.

\* \* \* \* \*